United States Patent
Lai (10) Patent No.: US 8,224,167 B2
(45) Date of Patent: Jul. 17, 2012

(54) DIOPTRIC ADJUSTMENT DEVICE FOR UNDERWATER VIEWFINDER

(75) Inventor: Yuk Shing Lai, Kowloon (HK)

(73) Assignee: Nauticam International Limited, Fo Tan (HK)

( * ) Notice: Subject to any disclaimer, the term of this patent is extended or adjusted under 35 U.S.C. 154(b) by 13 days.

(21) Appl. No.: 12/788,400

(22) Filed: May 27, 2010

(65) Prior Publication Data

US 2010/0303455 A1    Dec. 2, 2010

Related U.S. Application Data

(60) Provisional application No. 61/182,122, filed on May 29, 2009.

(51) Int. Cl.
*G03B 17/08* (2006.01)
*G03B 13/10* (2006.01)
*G03B 13/02* (2006.01)
*G03B 13/08* (2006.01)
*H04N 5/225* (2006.01)
*G02B 5/04* (2006.01)

(52) U.S. Cl. ............ 396/25; 396/29; 396/378; 396/384; 396/386; 348/341; 359/514; 359/834; 359/837

(58) Field of Classification Search .............. 396/25, 396/29, 84, 141, 148, 373, 378, 383, 384, 396/386; 348/333.09, 341; 359/514, 834, 359/837

See application file for complete search history.

(56) References Cited

U.S. PATENT DOCUMENTS

| 5,117,247 A | 5/1992 | Nakai et al. |
| 5,625,487 A | 4/1997 | Hasushita |
| 6,445,887 B1 | 9/2002 | Suzuka |
| 2005/0237613 A1 * | 10/2005 | Yamanouchi .............. 359/507 |

FOREIGN PATENT DOCUMENTS

JP    2002359760    12/2002

OTHER PUBLICATIONS

International Search Report and Written Opinion of the International Searching Authority in corresponding International application No. PCT/GB2010/001008, dated Sep. 6, 2010.
WETPIXEL webpage dated May 11, 2007, "Standard versus Enhanced Viewfinders—Size Matters" by Julian Scheunemann, 5 pages.

* cited by examiner

*Primary Examiner* — Rochelle-Ann J Blackman
(74) *Attorney, Agent, or Firm* — Young & Thompson (57) ABSTRACT

An adjustment device including an enhanced underwater viewfinder having, in use, a substantially watertight body and including a plurality of prisms within the body, at least one of the prisms being moveable by element of a control mechanism operable from a position exterior of the body.

20 Claims, 9 Drawing Sheets

DIOPTRIC ADJUSTMENT DEVICE FOR UNDERWATER VIEWFINDER

TECHNICAL FIELD

The invention relates to a dioptric adjustment device for an underwater viewfinder.

BACKGROUND ART

In underwater photography cameras originally designed for use on land are housed in various kinds of underwater housings in order to protect the cameras against water pressure at depths to as much as 90 meters or more. There are two main categories of cameras currently in use by underwater photographers:
1) Simple digital cameras normally referred to as 'point and shoot' camera, in which most users frame (compose) the pictures by looking at the rear LCD display; and
2) Single Lens Reflex cameras, in which users frame the pictures by viewing through the viewfinder of the camera.

When using the point and shoot cameras for underwater photography, users can always frame a picture from the LCD display of the camera, through a transparent window integrated into the underwater housing. The users can normally see a relatively clear display of the picture without any modification of the housing. However, the function of this kind of cameras is rather limited as the cameras are not designed with lens interchangeability to allow photographers to use different lenses.

A more serious underwater photographer utilizes different kinds of lenses for achieving different photographic effects. For example, some lenses known as macro lenses provide very close focusing capability for photographing extremely small objects; and some lenses provide extreme wide angle capability for wide angle scenes and big objects. Single Lens Reflex cameras are designed for this kind of lens interchangeability.

As mentioned, the Single Lens Reflex cameras (SLR cameras) are normally installed inside a specially built housing for underwater photography. The photographer looks through the viewfinder of the camera in order to frame his picture.

With the SLR camera installed in an underwater housing, the photographer positions his eye behind a window on the housing in order to view through the viewfinder of the SLR camera. However, as the housing is some distance away from the back of the camera; and the photographer has to wear a diving mask, his eye could be some 60 mm to 70 mm away from the ocular lens of the SLR camera viewfinder.

The SLR camera has a viewfinder system design such that the photographer sees a virtual image of the ground glass viewscreen of the SLR camera through the ocular lens. The image of the picture from the objective lens at the front of the SLR camera is firstly projected onto this ground glass viewscreen. Hence the photographer, when framing for a picture, sees an image equal to that projected onto the film (or sensor in case of a digital SLR) at the time when the camera is taking a picture.

The normal viewfinder system of a SLR camera allows a viewing distance of about 20 mm to 25 mm from the ocular lens. When the photographer has his eye positioned further away, as mentioned above in the case of taking underwater photographs using the SLR camera in an underwater housing, the photographer is unlikely to see the whole image through the ocular lens.

Hence, most underwater housing designed for SLR cameras have a wide angle viewer, which is similar to a door viewer, in order to bring a full view of the image to the user. In the case of looking through a door viewer, the image is very much compressed so as to allow a wider view of the outside image to pass through the viewer. Similarly, in the case of underwater photography using a SLR camera installed in an underwater housing with a wide angle viewer, the image is compressed and looks very small to the photographer. This presents a high degree of difficulty for the photographer who cannot clearly see the image from the SLR camera.

A device known as Enhanced Viewfinder has been designed to overcome this difficulty. An enhanced viewfinder utilizes a combination of terrestrial telescope and prism(s) to bring the view of the image from the SLR camera forward to the eyepiece so that the photographer has a view similar to that from the SLR ocular lens. But the design of conventional enhanced viewfinder does not allow for adjustment of eyesight while the photographer is using the camera underwater.

It is a common phenomenon that people have eyesight differences especially with advancing age. Some people are long-sighted while some are short-sighted. The SLR camera viewfinder system provides adjustment for eyesight compensation by moving the ocular lens forward or backward, which in effect adjusts the distance of the virtual image of the ground glass viewscreen from the ocular lens to compensate for different eyesight.

However once the SLR camera is installed inside an underwater housing, it cannot be adjusted from the outside of the underwater housing anymore. Certain enhanced viewfinders do provide a means to adjust for eyesight differences, but the designs are such that these adjustments have to be done prior to the dive by disassembling certain parts, and re-assembling them after the adjustment. This presents two problems:
1. Users cannot see the result of adjustments instantly. It always takes repeated disassembling, adjustment and then re-assembling until the result is acceptable.
2. The adjustments cannot be done while the enhanced viewfinder is in use underwater.

OBJECT OF THE INVENTION

It is an object of the invention to provide an adjustment device for an underwater viewfinder that ameliorates some of the disadvantages and limitations of the known art or which will at least provide the public with a useful choice.

DISCLOSURE OF INVENTION

In a first aspect the invention resides in an adjustment device comprising an enhanced underwater viewfinder having, in use, a substantially watertight body and including a plurality of prisms within the body, at least one of the prisms being moveable by means of a control mechanism operable from a position exterior of the body.

Preferably, three prisms are provided within the body, at least one of which is movable.

Preferably the control mechanism includes a rod which extends in substantially watertight fashion through the body, the movable prism being mounted such that when the rod is rotated the movable prism moves in a direction substantially in alignment with the longitudinal axis of the rod.

Preferably the rod is screw threaded and the movable prism is mounted in a holder having a screw threaded collar, the threads of the collar engaging the threads on the rod, the rod being substantially prevented from movement along the longitudinal axis thereof, so that when the rod is rotated the holder moves thereby moving the movable prism.

Alternatively two prisms are provided within the body, at least one of which is movable.

Preferably the control mechanism includes a rod which extends in substantially watertight fashion through the body, the movable prisms being mounted such that when the rod is rotated the movable prisms move mutually inwardly or outwardly in a direction substantially at right angles to the longitudinal axis of the rod.

Preferably a drive shaft is provided, the drive shaft being screw threaded and having two threaded parts the threads being oppositely handed, the movable prisms each being mounted in a holder having a screw threaded collar, the threads of the collar engaging one of the sets of threads on the rod, the drive shaft being substantially prevented from movement along the longitudinal axis thereof, so that when the drive shaft is rotated the holders moves thereby moving the movable prisms mutually inwardly or outwardly.

Preferably the rod is threaded and the drive shaft also carries a worm thread the worm thread being engaged by the threads on the rod such that when the rod is rotated the drive shaft is also rotated.

BRIEF DESCRIPTION OF DRAWINGS

The invention will now be described, by way of example only, by reference to the accompanying drawings in which.

BEST MODE FOR CARRYING OUT THE INVENTION

The following description will describe the invention in relation to preferred embodiments of the invention, namely an adjustment device. The invention is in no way limited to these preferred embodiments as they are purely to exemplify the invention only and that possible variations and modifications would be readily apparent without departing from the scope of the invention.

Figure 1:
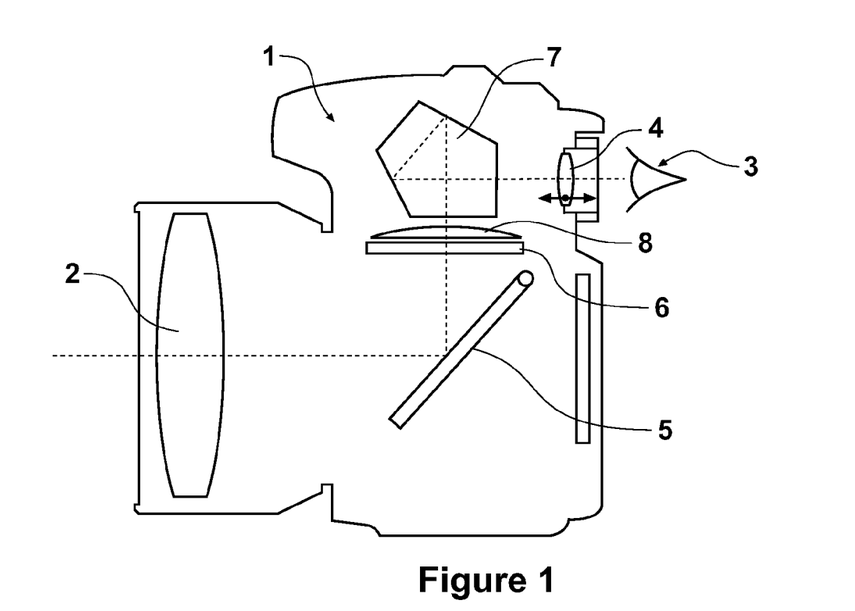
FIG. 1 is a cross sectional view of a common prior art SLR (single lens reflex) camera showing the adjustable ocular lens.

FIG. 1 shows a cross sectional view of a prior art SLR camera 1 illustrating the light path of an image travelling from the front of the objective lens 2 to the eye 3 of the photographer through the ocular lens 4. The image first passes through lens 2, is reflected by the mirror 5 to form a real image on the ground glass viewscreen 6. The photographer views through the adjustable ocular lens 4, the pentaprism 7 and the field lens 8 to see the image on the ground glass viewscreen 6.

The ground glass viewscreen 6 is translucent so that the image formed by the lens 2 can be seen through the ocular lens 4, pentaprism 7 and field lens 8. The ocular lens 4 is of an adjustable design so that it can be moved forward and backward to compensate for eyesight differences of different photographers. The pentaprism 7 helps to reflect the image three times inside itself such that the photographer sees an upright and laterally correct image.

Figure 2:
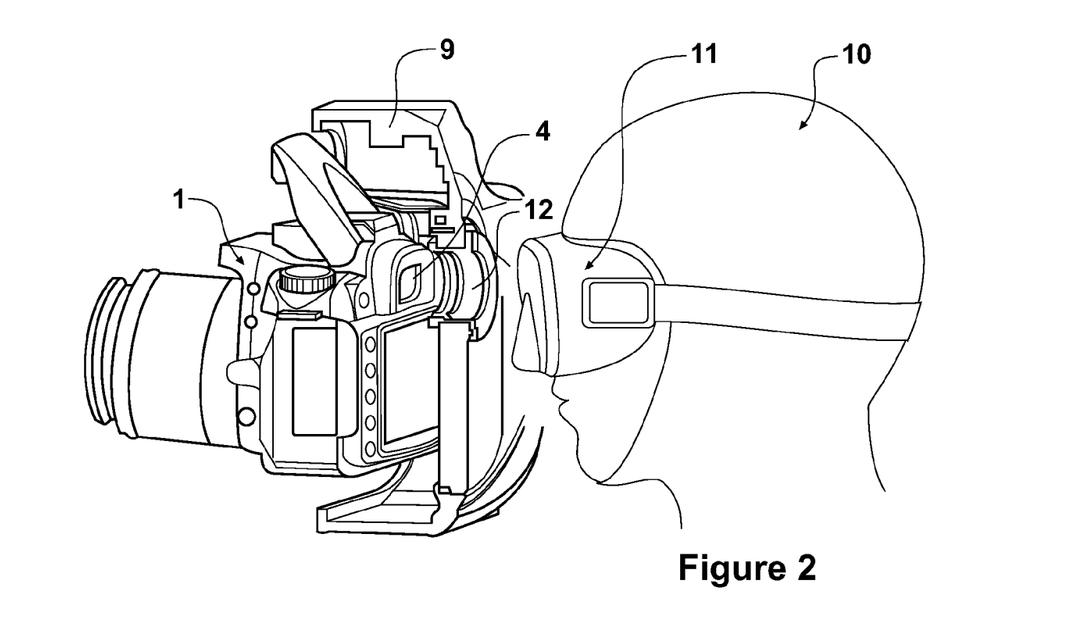
FIG. 2 is a view showing the position of the eye of photographer relative to the ocular of the prior art SLR when 1) the SLR is installed inside an underwater housing; and 2) the photographer is wearing a diving mask.

FIG. 2 illustrate the situation when the prior art camera 1 is installed inside an underwater housing 9. When the photographer 10, wearing a diving mask 11, views through the opening 12 of the housing 9 onto the ocular lens 4, his eye 3 could be as much as 60 mm to 70 mm away from the ocular lens 4.

The camera 1, designed for normal use on land, has an opening in the ocular lens 4 such that the photographer 10 sees the whole frame of the image with his eye 3 when the eye 3 is about 20 mm to about 25 mm away from the ocular lens 4. Hence, with his eye 3 60 to 70 mm away from the ocular lens 4, the photographer 10 cannot see the whole of the image on the ground glass viewscreen 6 at this distance.

Figure 3:
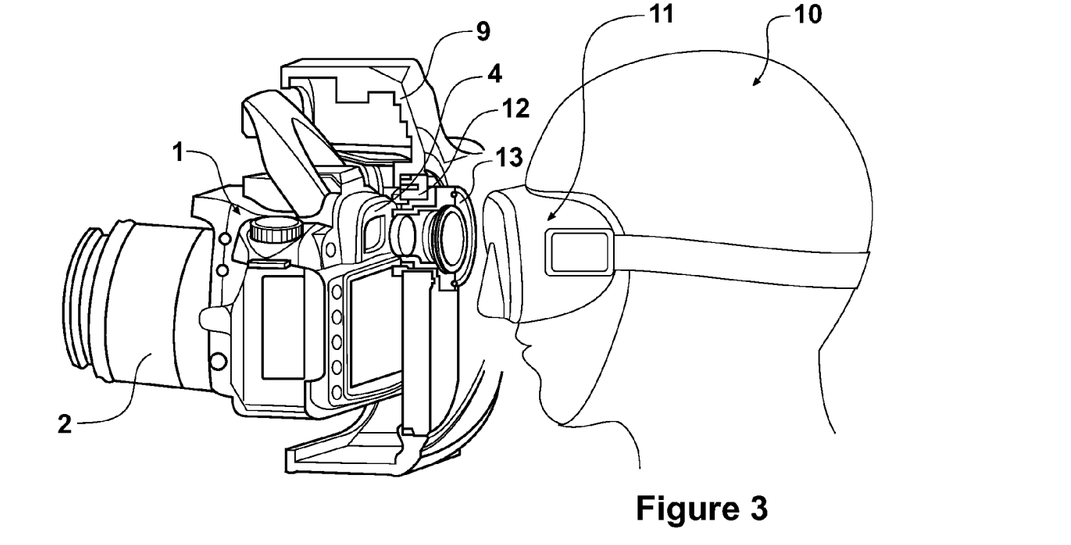
FIG. 3 is a view of FIG. 2 after installation of a wide angle viewer.

As shown in FIG. 3, most current underwater housings such as underwater housing 9 designed for SLR cameras such as SLR camera 1 has a wide angle viewer 13, which is similar to a door viewer, installed inside the opening 12 in order to bring a full view of the image of the ground glass viewscreen 6 to the photographer 10. However, the image is compressed and looks very small to the photographer 10. This presents a high degree of difficulty for the photographer 10 to see the image clearly.

Figure 4:
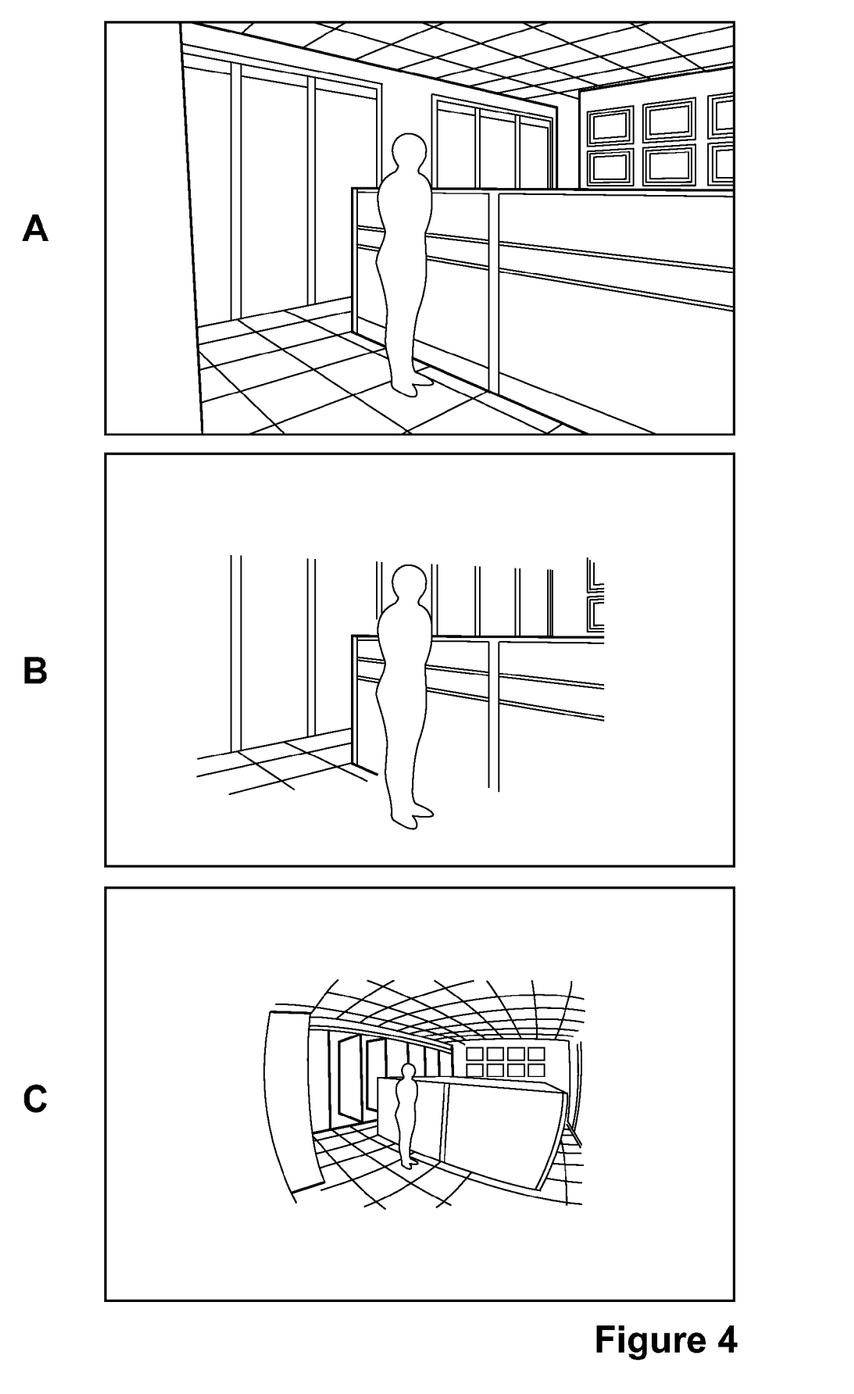
FIG. 4 is a comparison of views using a wide angle viewer.

FIG. 4 is a comparison of the simulated views the photographer 10 sees when:
a) In normal conditions, such as using the SLR camera 1 on land, and with the photographers eye 3 at normal viewing distance of between 20 mm and 25 mm from the ocular lens 4;
b) The SLR camera 1 is installed inside the underwater housing 9; and the photographer 10 is wearing a diving mask 11. The photographer is behind the underwater housing 9 without the wide angle viewer 13 shown in FIG. 2. The photographer 10 has his eye 3 around 60 mm to 70 mm away from the ocular lens 4. The shaded area shows the portion of the frame being blocked by the opening of the ocular lens 4;
c) As in condition b) but with the wide angle viewer 13 installed in opening 12 as in FIG. 3. Although the photographer can see the whole image on the ground glass viewscreen 6, the image appears compressed and looks very small as well as being distorted.

Figure 5:
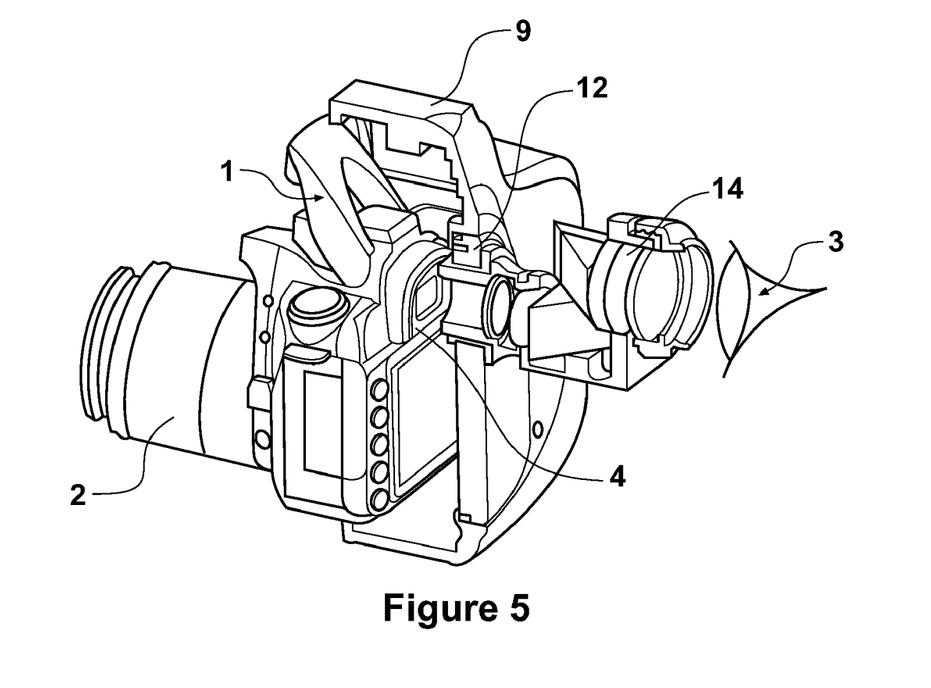
FIG. 5 is a cross sectional view of a prior art enhanced 180° viewfinder mounted onto an underwater housing.

A 180° enhanced viewfinder 14 (prior art) improves the quality of the image visible to the photographer by replacing the wide angle viewer 13 in the opening 12, as illustrated in FIG. 5. It is usually called a 180° enhanced viewfinder as the front end and the rear end are at 180° to each other. The viewfinder 14 has, at least in use, a substantially watertight body.

Figure 6:
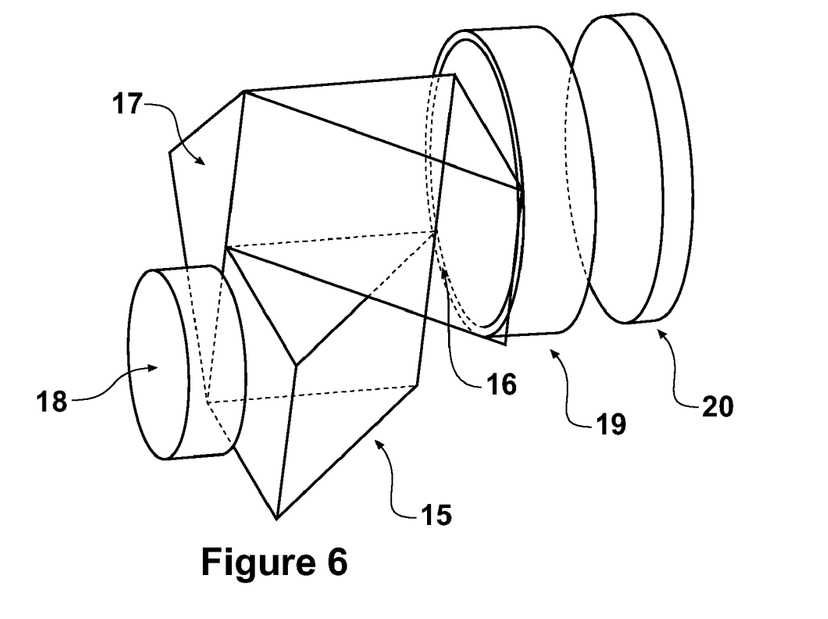
FIG. 6 is a perspective view of the optical elements of the prior art enhanced 180° viewfinder.

As illustrated in FIG. 6, the optical device inside a 180° enhanced viewfinder is a combination of a terrestrial telescope and a plurality of prisms such as the set of prisms 15, 16 & 17 cemented together and known as the 'Abbe erection system' or Abbe prism assembly (prior art, named after Ernst Abbe). This construction is frequently used in binoculars and telescopes for correcting the orientation of the images.

A terrestrial telescope comprises of a group of one or several pieces of lens as the objective lens; and another group of one or several pieces of lens at the other end as the eyepiece. Here in the example in FIG. 6 one lens 18 is the objective lens; and lens 19 and lens 20 are grouped together as the eyepiece.

The objective lens 18 forms an inverted (up side down) and reversed (left to the right) image between the objective lens 18 and the eyepiece 19 and 20. It is necessary to make use of a set of Abbe prism assembly (prisms 15, 16 and 17) to correct the orientation of the image such that the photographer sees an upright and laterally correct image.

The prisms 15, 16 & 17 are made of optical glass with the characteristic that light entering the glass surface at a right angle can go into the prism; and upon hitting the 45 degrees surface is internally reflected; and as soon as it arrives the third surface at right angle it exits the prism.

Figure 7:
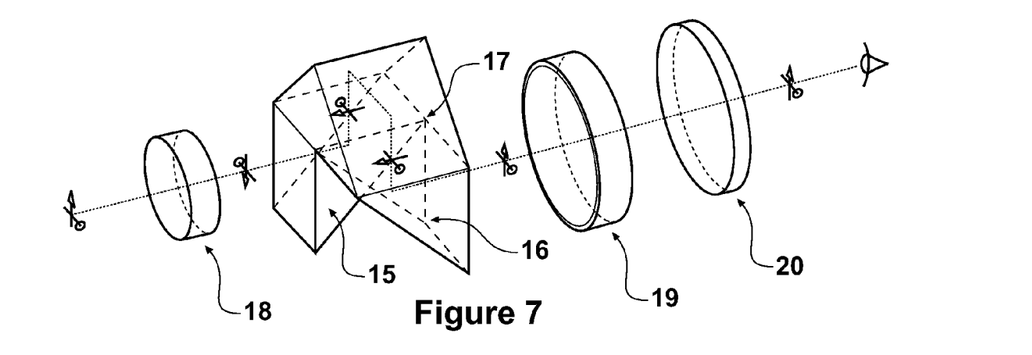
FIG. 7 is a perspective view of the prior art layout of the prisms showing the correction of the orientation of the image from the objective lens.

FIG. 7 shows the symbolic representation of the image orientation between objective lens 18 and eyepiece 19 and 20 after each reflection inside of the prisms 15, 16 and 17. The components are expanded and the view is rotated 90° clockwise to show the symbols better.

Figure 8:
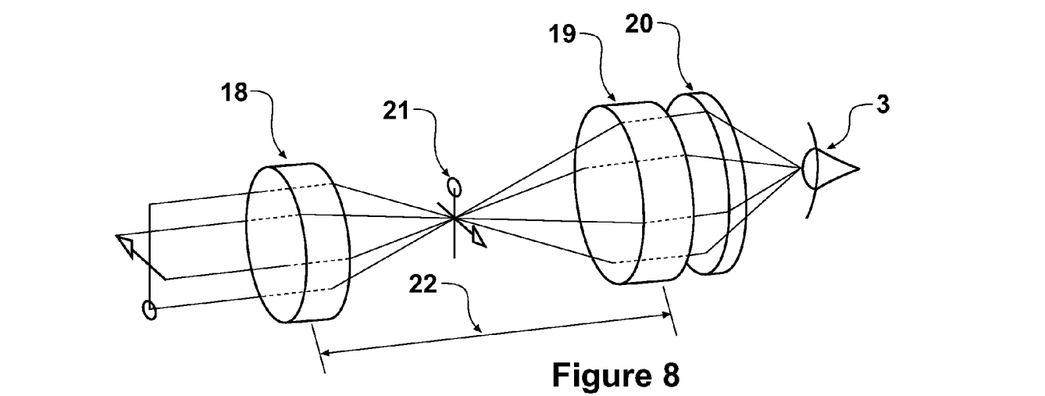
FIG. 8 is an illustration of the relationship of an objective lens and the eyepiece in a prior art telescope.

As illustrated by FIG. 8, in a typical terrestrial telescope, the image 21 formed by the objective lens 18 is a real image between the objective lens 18 and the eyepiece 19 and 20; The distance 22 between them has to be adjusted so that the photographer 10 can focus on this image 21. This distance 22 can be adjusted to accommodate differences in eyesight. For short-sighted people the distance 22 has to be less; and for long-sighted people the distance 22 has to be more.

Figure 9:
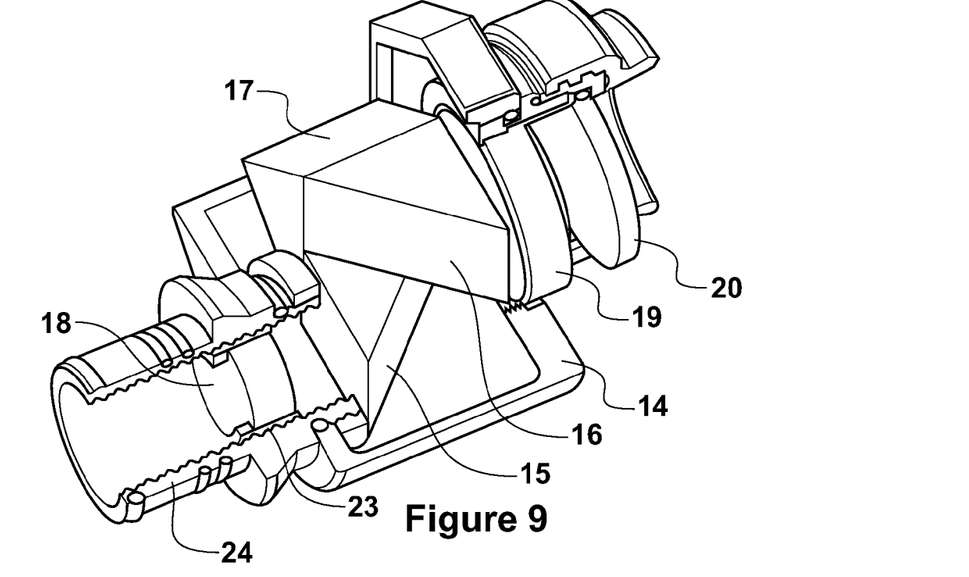
FIG. 9 is a perspective view of a prior art enhanced 180° viewfinder.

An example is illustrated by FIG. 9 where the objective lens 18 is installed inside a sleeve 23 with external thread; and located inside a barreled housing 24 with an internal thread. The sleeve 23, together with the objective lens 18 installed inside, can be rotated in either directions by the user to adjust for their distance from the eyepiece.

Where the enhanced viewfinder is to be used underwater, it is crucial that the whole unit is sealed against outside water pressure. The adjustment method as illustrated by FIG. 9 is normally the only possible means for the photographer to make eyesight compensation adjustments.

However, it usually involves many tedious steps in order to make the adjustment. The photographer will not visualize the result without putting the SLR camera 1, the underwater housing 9 and the enhanced viewfinder 14 in place. As shown in FIG. 5: firstly, he has to install the SLR camera 1 inside the housing 9; secondly, install the enhanced viewfinder 14 onto the rear of the housing 9. Then he has to check whether the focus is suitable for him.

Should the photographer find that an adjustment is necessary, which is the usual case, he has to take out the enhanced viewfinder 14 and adjust the focus by turning the sleeve 23, and then putting it back onto the housing 9 again to check the new focus. The problem is that the photographer has no idea of the effect of the adjustment until he puts everything back into position as per FIG. 5 and visually verifies the focus. As such, it is usual that he has to repeat the entire procedure several times until he finds the right focus.

This disadvantage is exacerbated as the adjustment cannot be made once the photographer starts diving in the water.

Figure 10:
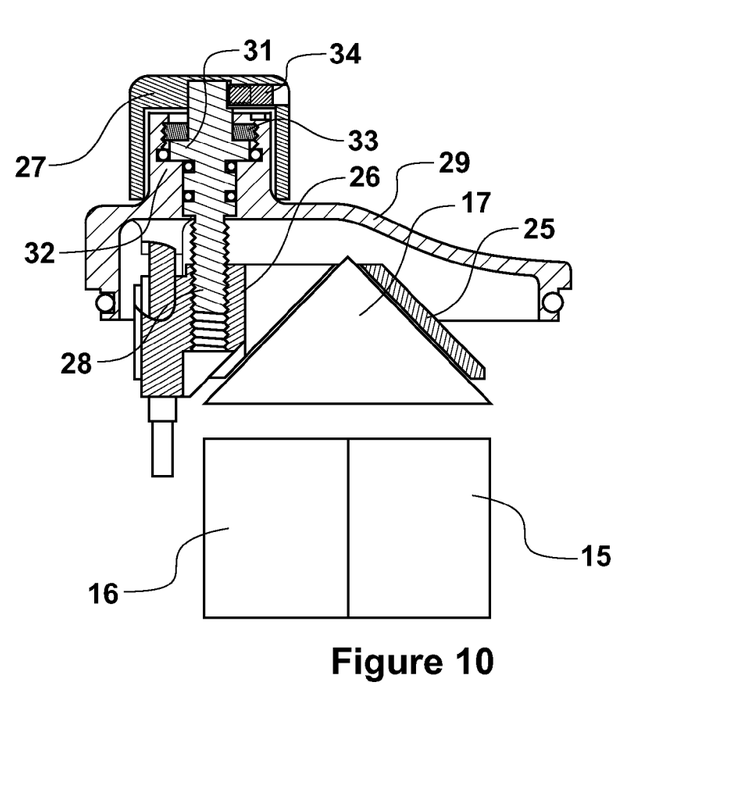
FIG. 10 is a cross sectional view showing a mechanism for adjusting the distance between prisms in a preferred form of the invention.

This invention provides a means to adjust the length of the light path between the objective lens and the eyepiece without moving either one of them. Referring now to FIG. 10 this adjustment is carried out by separating the Abbe prism assembly into two groups: prisms 15 and 16 are mounted in a fixed position to a suitable part of the enhanced view finder 14; and prism 17 is mounted onto a movable device or holder 25 linked or connected to a collar such as threaded bushing 26. By operating a control mechanism exterior to the body of the viewer 14 the prism 17 is moved. This may be achieved, for example, by turning a knob 27, positioned outside the enhanced view finder 14, and which connects with a rod such as screw 28 positioned inside the threaded bushing 26. Thus the user can adjust the distance between the two groups of prisms 15, 16 and 17, thereby changing the length of the light path, which effectively varies the optical distance between the objective lens 18 and the eyepiece 19 and 20 (not shown in this figure). The adjustment for different eyesight is therefore achieved by turning the knob 27 which is positioned outside the enhanced view finder 14 which is positioned behind the underwater camera housing 9.

The screw 28 passes through the wall 29 of the enhanced view finder 14 and is sealed against water ingress in any suitable manner, such as by the use of "o-rings" 30. The wall 29 of the enhanced view finder 14 and the screw 28 are shaped so that rotation of screw 28 does not cause movement of the screw 28 along its longitudinal axis. The screw 28 may be retained by providing a flange 31 on the screw 28 which is held between a rebate 32 in the wall 29 and a collar 33 having threads on its outer periphery which engage corresponding threads in the wall 29.

The knob 27 may be held in place on the screw 28 by a grub screw 34 or in any other suitable way.

Figure 11:
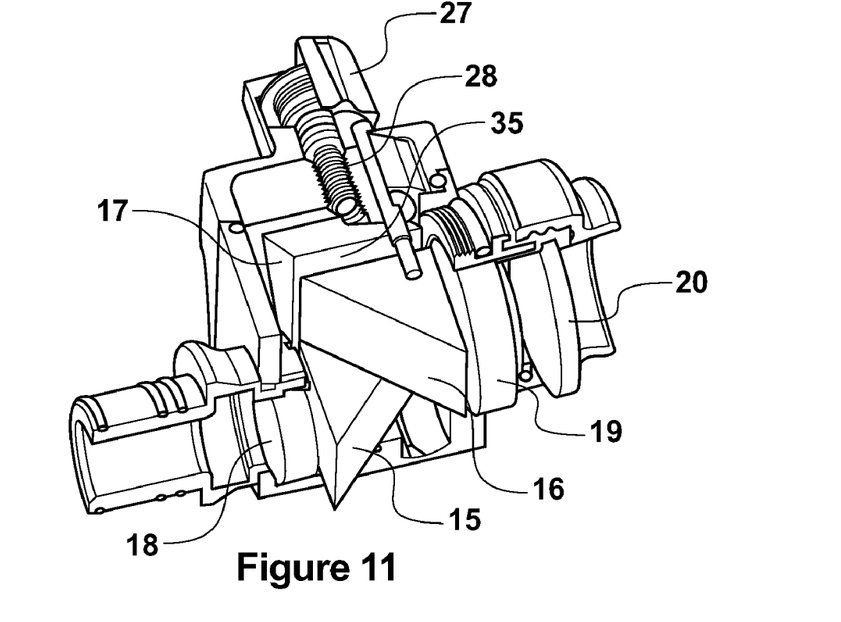
FIG. 11 is a perspective view showing the mechanism for adjusting the distance between the prisms in the form of the invention according to FIG. 10.

FIG. 11 is a perspective view showing a displacement gap 35 between prisms 15 and 16 and prism 17. This displacement 29 is adjusted by turning the outside knob 27 in order to slide prism 17 towards or away from prisms 15 and 16. Both the prisms 15 and 16, the objective lens 18 and the eyepiece 19 and 20 remain stationary during the adjustment procedure.

Figure 12:
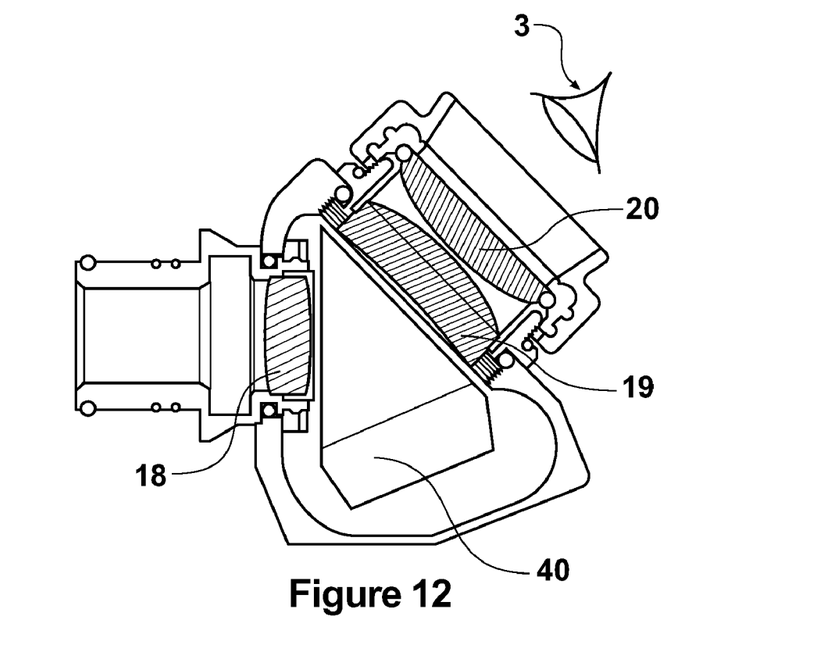
FIG. 12 is a cross sectional view of a prior art enhanced 135° viewfinder.

FIG. 12 illustrates an alternative form of enhanced viewfinder design (prior art) usually called the 135° enhanced viewfinder as the front end and the rear end are at 135° to each other. It has the same objective lens 18 and eyepiece 19 and 20 construction as the 180° enhanced viewfinder.

The prism 40 is known as Schmidt prism (prior art), it is usually used as an erecting system in telescopes.

Figure 13:
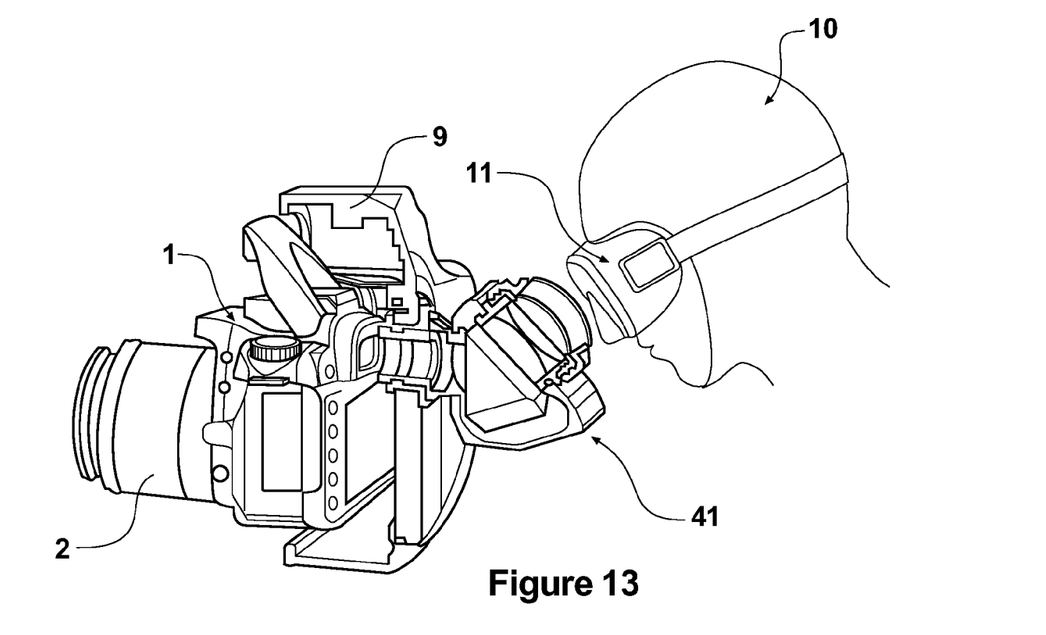
FIG. 13 is a perspective view of the enhanced 135° viewfinder of FIG. 12 mounted onto an underwater housing.

FIG. 13 illustrates the 135° enhanced viewfinder 41 being mounted onto an underwater housing 9.

Figure 14:
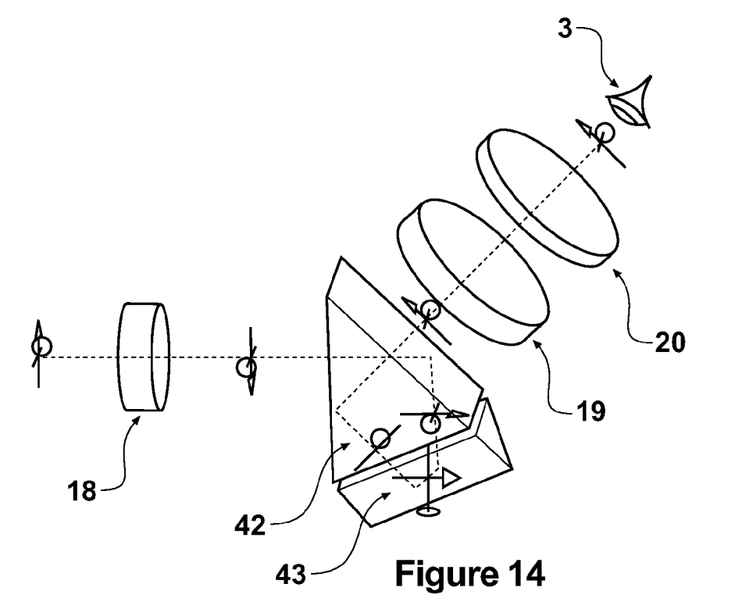
FIG. 14 is a perspective view of the layout of the prior art prisms showing the correction of the orientation of the image from the objective lens.

In this invention the Schmidt prism is replaced by two Delta prisms 42 and 43. FIG. 14 shows the symbolic representation of the image orientation between objective lens 18 and eyepiece 19 and 20 after each reflection inside of the prism 40. The components are shown expanded to allow space for drawing the symbols.

Figure 15:
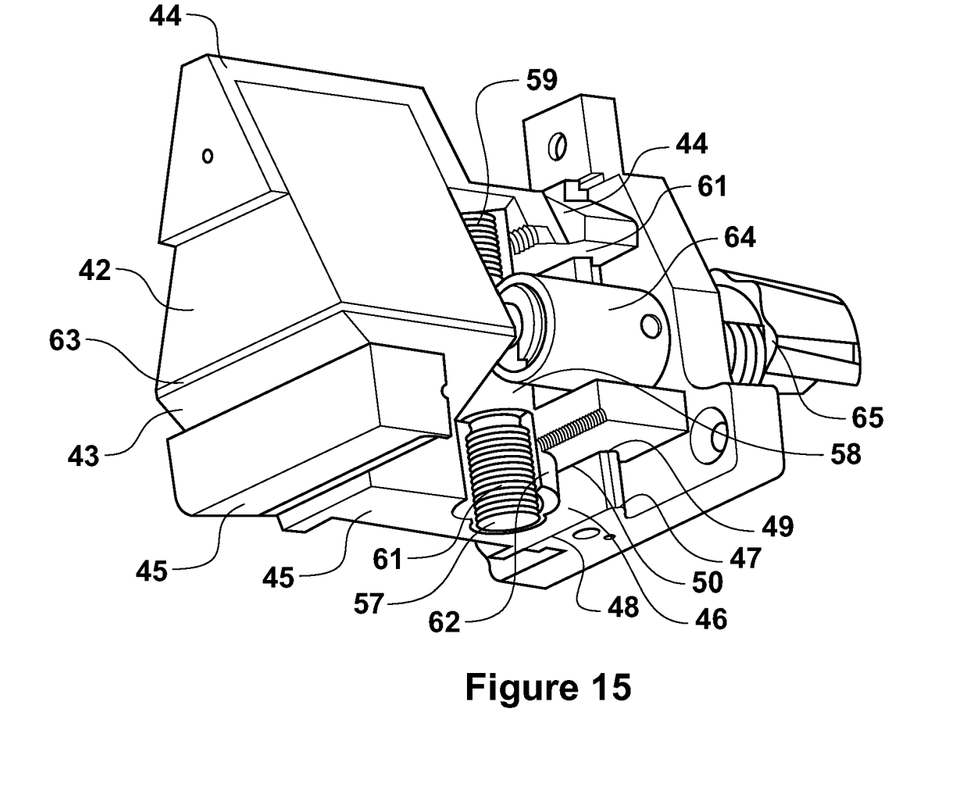
FIG. 15 is a perspective view showing the mechanism for adjusting the distance between the prisms in a further preferred form of the invention.

As shown in FIG. 15, Delta prism 42 is mounted onto a holder 44; and the Delta prism 43 is mounted onto a holder 45. The holders 44 and 45 rest on the same rail 46 such that they can be moved towards or away from each other, preferably by sliding along the rail 46. Thus the rail 46 may have a pair of lobes 47 and 48 which engage into slots such as slot 49 formed in a channel 50 in the holders 44 and 45.

A drive shaft 57 is designed with a worm gear 58 in the middle, a right-hand thread 59 on one end; and a left-hand thread 60 on the other end. The holder 44 has a right-hand threaded collar 61 inside of it; and the holder 45 has a left-hand threaded collar 62 inside of it. Thus when the drive shaft 57 and the holders 44 and 45 are assembled together, the distance between the holders 44 and 45 can be adjusted by turning the drive shaft 57.

As the Delta prisms 42 and 43 are respectively mounted onto holders 44 and 45, by turning the drive shaft 57 one can adjust the distance 63 between the Delta prisms 42 and 43, thereby varying the effective length of the light path between the objective lens 18 and the eyepiece 19 and 20 (not shown in FIG. 15).

The worm gear 58 being part of the drive shaft 57 is engaged by worm thread 64, which is connected to a knob 65 by a rod passing through the body of viewer 41. The knob is again outside the enhanced view finder 41. Suitable sealing against water ingress is again provided as for the constructions of FIGS. 10 and 11. The adjustment for different eyesight is therefore achieved by turning the knob 65 which rotates the drive shaft 57 to move the holders 44 and 45.

To summarize, for both the 180° enhanced viewfinder 14 and the 135° enhanced viewfinder 41, this invention provides a means for the user to be able to make continuous and instant adjustment to compensate for his eyesight by simply turning a knob from the outside of the unit, even when the viewfinder is used for taking photographs underwater.

ADVANTAGES

At least the preferred form of the invention has the following advantages:
1. When adjusting the enhanced viewfinder with this method, the photographer visualize a continuous change of focus showing the instant effect of the adjustment, this makes him much easier in judging the best focus for his eyesight without repeatedly taking away and putting back the enhanced viewfinder from the underwater housing.
2. The adjustment can be carried out even when the unit is underwater.
3. Different photographers with different eyesight can share the camera underwater as the compensation for eyesight can be made underwater.

VARIATIONS

Throughout the description of this specification, the word "comprise" and variations of that word such as "comprising" and "comprises", are not intended to exclude other additives, components, integers or steps.

It will of course be realised that while the foregoing has been given by way of illustrative example of this invention, all such and other modifications and variations thereto as would be apparent to persons skilled in the art are deemed to fall within the broad scope and ambit of this invention as is hereinbefore described.

The invention claimed is:

1. An adjustment device comprising an enhanced underwater viewfinder having, in use, a substantially watertight body and including a plurality of prisms within the body, at least one of the prisms being moveable to change a distance between at least two of the prisms, said movement being effected by means of a control mechanism operable from a position exterior of the body.

2. An adjustment device as claimed in claim 1 wherein three prisms are provided within the body, at least one of which is movable.

3. An adjustment device as claimed in claim 2 wherein the control mechanism includes a rod which extends in substantially watertight fashion through the body, the movable prism being mounted such that when the rod is rotated the movable prism moves in a direction substantially in alignment with the longitudinal axis of the rod.

4. An adjustment device as claimed in claim 2 wherein a drive shaft is provided, the drive shaft being screw threaded and having two threaded parts the threads being oppositely handed, the movable prisms each being mounted in a holder having a screw threaded collar, the threads of the collar engaging one of the sets of threads on the rod, the drive shaft being substantially prevented from movement along the longitudinal axis thereof, so that when the drive shaft is rotated the holders moves thereby moving the movable prisms mutually inwardly or outwardly.

5. An adjustment device as claimed in claim 3 wherein the rod is screw threaded and the movable prism is mounted in a holder having a screw threaded collar, the threads of the collar engaging the threads on the rod, the rod being substantially prevented from movement along the longitudinal axis thereof, so that when the rod is rotated the holder moves thereby moving the movable prism.

6. An adjustment device as claimed in claim 1 wherein the control mechanism includes a rod which extends in substantially watertight fashion through the body, the movable prism being mounted such that when the rod is rotated the movable prism moves in a direction substantially in alignment with the longitudinal axis of the rod.

7. An adjustment device as claimed in claim 6 wherein the rod is screw threaded and the movable prism is mounted in a holder having a screw threaded collar, the threads of the collar engaging the threads on the rod, the rod being substantially prevented from movement along the longitudinal axis thereof, so that when the rod is rotated the holder moves thereby moving the movable prism.

8. An adjustment device as claimed in claim 1 wherein two prisms are provided within the body, at least one of which is movable.

9. An adjustment device as claimed in claim 8 wherein the control mechanism includes a rod which extends in substantially watertight fashion through the body, the movable prisms being mounted such that when the rod is rotated the movable prisms move mutually inwardly or outwardly in a direction substantially at right angles to the longitudinal axis of the rod.

10. An adjustment device as claimed in claim 8 wherein a drive shaft is provided, the drive shaft being screw threaded and having two threaded parts the threads being oppositely handed, the movable prisms each being mounted in a holder having a screw threaded collar, the threads of the collar engaging one of the sets of threads on the rod, the drive shaft being substantially prevented from movement along the longitudinal axis thereof, so that when the drive shaft is rotated the holders moves thereby moving the movable prisms mutually inwardly or outwardly.

11. An adjustment device as claimed in claim 9 wherein a drive shaft is provided, the drive shaft being screw threaded and having two threaded parts the threads being oppositely handed, the movable prisms each being mounted in a holder having a screw threaded collar, the threads of the collar engaging one of the sets of threads on the rod, the drive shaft being substantially prevented from movement along the longitudinal axis thereof, so that when the drive shaft is rotated the holders moves thereby moving the movable prisms mutually inwardly or outwardly.

12. An adjustment device as claimed in claim 1 wherein a drive shaft is provided, the drive shaft being screw threaded and having two threaded parts the threads being oppositely handed, the movable prisms each being mounted in a holder having a screw threaded collar, the threads of the collar engaging one of the sets of threads on the rod, the drive shaft being substantially prevented from movement along the longitudinal axis thereof, so that when the drive shaft is rotated the holders moves thereby moving the movable prisms mutually inwardly or outwardly.

13. An adjustment device as claimed in claim 12 wherein the rod is threaded and the drive shaft also carries a worm thread the worm thread being engaged by the threads on the rod such that when the rod is rotated the drive shaft is also rotated.

14. An adjustment device as claimed in claim 1, in combination with an underwater camera.

15. An adjustment device comprising
an enhanced underwater viewfinder having, in use, a substantially watertight body and including three prisms within the body, at least one of the prisms being movable to change a distance between at least two of the prisms, said movement being effected by means of a control mechanism from a position exterior of the body.

16. An adjustment device comprising an enhanced underwater viewfinder having, in use, a substantially watertight body and including a plurality of prisms within the body, at least one of the prisms being movable by means of a control mechanism from a position exterior of the body, the control mechanism including a rod which extends in substantially watertight fashion through the body, at least one movable prism being mounted such that when the rod is rotated that movable prism moves in a direction substantially in alignment with the longitudinal axis of the rod, and wherein the rod is screw threaded and that movable prism is mounted in a holder having a screw threaded collar, the threads of the collar engaging the threads on the rod, the rod being substantially prevented from movement along the longitudinal axis thereof, so that when the rod is rotated the holder moves thereby moving that movable prism.

17. An adjustment device comprising an enhanced underwater viewfinder having, in use, a substantially watertight body and including a plurality of prisms within the body, two of the prisms being movable by means of a control mechanism from a position exterior of the body, a drive shaft being provided, the drive shaft being screw threaded and having two threaded parts the threads being oppositely handed, the movable prisms each being mounted in a holder having a screw threaded collar, the threads of the collar engaging one of the sets of threads on the rod, the drive shaft being substantially prevented from movement along the longitudinal axis thereof, so that when the drive shaft is rotated the holders move thereby moving the movable prisms mutually inwardly or outwardly.

18. An adjustment device comprising an enhanced underwater viewfinder having, in use, a substantially watertight body and including a plurality of prisms within the body, at least two of the prisms being movable by means of a control mechanism from a position exterior of the body, the control mechanism including a rod which extends in substantially watertight fashion through the body, the movable prisms being mounted such that when the rod is rotated the movable prisms move in a direction substantially at right angles to the longitudinal axis of the rod, a drive shaft able to be rotated by the rod being provided, the drive shaft being screw threaded and having two threaded parts the threads being oppositely handed, the movable prisms each being mounted in a holder having a screw threaded collar, the threads of the collar engaging one of the sets of threads on the drive shaft, the drive shaft being substantially prevented from movement along the longitudinal axis thereof, so that when the drive shaft is rotated the holders move thereby moving the movable prisms mutually inwardly or outwardly.

19. An adjustment device comprising an enhanced underwater viewfinder having, in use, a substantially watertight body and including a plurality of prisms within the body, at least one of the prisms being moveable by means of a control mechanism operable from a position exterior of the body, which control mechanism includes a rod which extends in substantially watertight fashion through the body, the movable prism being mounted such that when the rod is rotated the movable prism moves in a direction substantially in alignment with the longitudinal axis of the rod.

20. An adjustment device comprising an enhanced underwater viewfinder having, in use, a substantially watertight body and including a plurality of prisms within the body, at least one of the prisms being moveable by means of a control mechanism operable from a position exterior of the body, which control mechanism includes a rod which extends in substantially watertight fashion through the body, the movable prisms being mounted such that when the rod is rotated the movable prisms move mutually inwardly or outwardly in a direction substantially at right angles to the longitudinal axis of the rod.

* * * * *